United States Patent
Ewald et al.

(10) Patent No.: US 8,695,489 B2
(45) Date of Patent: Apr. 15, 2014

(54) FOOD STAGING DEVICE

(75) Inventors: Henry T. Ewald, Roselle, IL (US);
Glenn Schackmuth, Oswego, IL (US);
Paul G. Simmons, Glen Ellyn, IL (US);
Robert C. Fortmann, Grayslake, IL (US)

(73) Assignee: Restaurant Technology, Inc., Oak Brook, IL (US)

( * ) Notice: Subject to any disclaimer, the term of this patent is extended or adjusted under 35 U.S.C. 154(b) by 1287 days.

(21) Appl. No.: 11/414,065

(22) Filed: Apr. 28, 2006

(65) Prior Publication Data
US 2007/0251667 A1    Nov. 1, 2007

(51) Int. Cl.
*A23C 3/02* (2006.01)
*A23C 15/04* (2006.01)
*A01J 11/00* (2006.01)

(52) U.S. Cl.
USPC .............................................. 99/483; 99/468

(58) Field of Classification Search
USPC ............ 99/467, 374, 389, 448, 468, 483, 418
See application file for complete search history.

(56) References Cited

U.S. PATENT DOCUMENTS

| | | | |
|---|---|---|---|
| 2,041,258 A * | 5/1936 | Mitchell | 160/121.1 |
| 2,122,532 A | 7/1938 | Mims et al. | |
| 3,136,356 A | 6/1964 | Mears | |
| 3,241,899 A * | 3/1966 | Donker | 312/116 |
| 3,331,425 A | 7/1967 | Groves et al. | |
| 3,542,445 A * | 11/1970 | Donker | 312/116 |
| 3,942,426 A | 3/1976 | Binks et al. | |
| 4,095,642 A | 6/1978 | McKinnon et al. | |
| 4,109,484 A | 8/1978 | Cunningham | |
| 4,165,778 A | 8/1979 | Smith | |
| 4,180,125 A * | 12/1979 | Schulz et al. | 165/48.1 |
| 4,186,790 A | 2/1980 | Schenker et al. | |
| 4,254,824 A * | 3/1981 | Springer | 165/64 |
| 4,296,792 A | 10/1981 | Gidge et al. | |
| 4,312,396 A | 1/1982 | McKinnon et al. | |
| 4,313,485 A * | 2/1982 | Gidge et al. | 160/328 |
| 4,382,461 A * | 5/1983 | Schenker | 160/329 |
| 4,384,606 A | 5/1983 | Johnston et al. | |
| 4,388,961 A | 6/1983 | Schaefer et al. | |
| 4,392,360 A * | 7/1983 | Gidge et al. | 62/249 |
| 4,454,904 A * | 6/1984 | Oxman | 160/332 |
| 4,607,678 A | 8/1986 | Pomaville et al. | |
| 4,784,054 A * | 11/1988 | Karos et al. | 99/483 |
| 4,801,180 A | 1/1989 | Styles | |
| 4,822,981 A | 4/1989 | Chaudoir | |
| 5,016,527 A * | 5/1991 | Spamer et al. | 454/193 |

(Continued)

FOREIGN PATENT DOCUMENTS

| | | | | |
|---|---|---|---|---|
| JP | 2001255054 | * | 9/2001 | .............. F25D 23/02 |
| JP | 2001255054 A | * | 9/2001 | .............. F25D 23/02 |
| WO | WO 2005/044069 A1 | | 5/2005 | |
| WO | WO 2005/079634 A1 | | 9/2005 | |

*Primary Examiner* — Henry Yuen
*Assistant Examiner* — Hemant Mathew
(74) *Attorney, Agent, or Firm* — Hinshaw & Culbertson LLP

(57) ABSTRACT

A cooked food staging device and method are provided. The device and method are particularly suited for storing breaded, battered or bread food items for extended periods of time without becoming soggy. A heated compartment having a slot has a flexible member covering at least a portion of the slot to restrict airflow and to permit access to the food items contained therein, which may be contained on trays, without the necessity of removing the tray to view and remove selected food items therefrom.

18 Claims, 9 Drawing Sheets

(56) References Cited

U.S. PATENT DOCUMENTS

| | | | |
|---|---|---|---|
| 5,127,460 A * | 7/1992 | Abadi et al. | 160/332 |
| 5,172,328 A | 12/1992 | Cahlander et al. | |
| 5,697,291 A * | 12/1997 | Burgener et al. | 99/451 |
| 5,724,886 A | 3/1998 | Ewald et al. | |
| 5,783,803 A | 7/1998 | Robards, Jr. | |
| 5,852,967 A | 12/1998 | Fortmann et al. | |
| 5,900,173 A * | 5/1999 | Robards, Jr. | 219/392 |
| 5,931,083 A | 8/1999 | Stanger et al. | |
| 5,947,012 A | 9/1999 | Ewald et al. | |
| 6,119,587 A * | 9/2000 | Ewald et al. | 99/374 |
| 6,175,099 B1 | 1/2001 | Shei et al. | |
| 6,209,447 B1 | 4/2001 | Ewald et al. | |
| 6,262,394 B1 | 7/2001 | Shei et al. | |
| 6,358,548 B1 | 3/2002 | Ewald et al. | |
| 6,412,403 B1 | 7/2002 | Veltrop | |
| 6,541,739 B2 | 4/2003 | Shei et al. | |
| 6,607,766 B2 | 8/2003 | Ewald et al. | |
| 6,637,322 B2 | 10/2003 | Veltrop | |
| 6,658,992 B2 | 12/2003 | Zelander | |
| 6,658,994 B1 * | 12/2003 | McMillan | 99/468 |
| 6,783,199 B2 | 8/2004 | Parrott | |
| 6,878,391 B2 | 4/2005 | Veltrop | |
| 6,884,451 B2 | 4/2005 | Veltrop | |
| 7,905,173 B2 * | 3/2011 | Sus et al. | 99/483 |
| 2002/0094361 A1 | 7/2002 | Veltrop | |
| 2002/0100756 A1 | 8/2002 | Veltrop | |
| 2002/0102337 A1 | 8/2002 | Veltrop | |
| 2002/0172742 A1 | 11/2002 | Veltrop | |
| 2003/0080657 A1 | 5/2003 | Koopman | |
| 2003/0118706 A1 | 6/2003 | Veltrop | |
| 2003/0188929 A2 | 10/2003 | Winfree et al. | |
| 2004/0033297 A1 | 2/2004 | Lee et al. | |
| 2004/0208961 A1 | 10/2004 | Reckert et al. | |
| 2005/0255208 A1 | 11/2005 | Shei | |
| 2006/0045943 A1 | 3/2006 | Calzada et al. | |

* cited by examiner

FOOD STAGING DEVICE

FIELD OF THE INVENTION

The present invention relates to a food staging device. It also relates to a method of storing foods and a method of making a sandwich.

BACKGROUND OF THE INVENTION

Many restaurants must prepare a high volume of food relatively quickly. Sandwiches are common lunch and dinner foods that are served at many such restaurants, where a large volume of such items needs to be prepared relatively quickly, particularly during lunch and dinner times. Since a high volume needs to be prepared quickly, labor requirements can be substantial, particularly for the high volume periods of breakfast, lunch, and dinner. Additionally, breaded and fried foods prepared too far in advance of serving become soggy while being stored.

Since some restaurants sell very large quantities of food, even a small increase in the efficiency of handling sandwich cooking and preparation would be desirable.

It is desirable to prepare the individual components of a sandwich in large quantities at the same time and store the individual components until needed to prepare the sandwich. As such, it would be desirable to store breaded and fried foods in a staging device that allows these foods to be prepared in advance of serving without becoming soggy.

Flavor characteristics and taste sensations of sandwiches are important factors consumers use to evaluate a product. It is important for consumer satisfaction that consumers receive breaded products that are of a consistent, fresh, crispy quality and are not soggy.

In view of the foregoing, there exists a need for a staging device and method that will allow foods to be stored after cooking while maintaining a fresh and crispy quality without becoming soggy. A need further exists for a staging device and method for reducing the labor intensity required at peak serving times while maintaining product quality.

A need further exists for a method of preparing a sandwich to ensure product uniformity maintaining breading with a fresh and crispy quality.

SUMMARY OF THE INVENTION

In accordance with the present invention, a staging device for holding a plurality of food portions is provided which comprises at least one compartment for holding the food portions having a compartment height and preferably bounded by an upper heated compartment surface, a heating device for maintaining an elevated temperature in the compartment, a cabinet defining a volume that encloses the compartment therein including at least one slot for removing the food portions from the compartment, and a flexible member covering at least an upper portion of the slot. The flexible member is readily deflectable to permit access to the interior of the compartment for removing items therefrom, such as items contained in a tray without the need for removing the tray from the compartment. Airflow into and out of the compartment is limited by the flexible member. In one embodiment, the flexible member may be in the form of a flexible sheet which may be a relatively thin material and is preferably transparent, allowing the user to view the items contained in the compartment, again without requiring removal of the food-containing tray. The sheet material, preferably PTFE, such as TEFLON®, is durable and transparent. Typically, the sheet material can be any desired thickness and can be about 0.050 inches, 0.03 inches or less in thickness, and may be from about 0.004 to 0.010 inches thick, for example.

Typically, the compartment is further bounded by a lower heated surface. The staging device may further comprise at least one raised curb attached to the lower surface. The curb can act to restrain movement of a tray contained in the compartment. This can be particularly advantageous when removing food items contained in the tray without removing the tray from the compartment and without handling the tray. The staging device may further comprise at least one tray for containing the food portions.

Typically, the staging device will be configured so that there is a gap between the flexible member and the bottom of the cabinet. This gap may be of any suitable height to permit easy insertion of a tray containing food and to allow a desired amount of airflow such as to permit sufficient airflow to and from the cabinet to prevent breaded or bread-containing products stored within the cabinet from becoming soggy. Typically, this gap is approximately two inches for a compartment having a height in the range of from about 5 inches to about 7 inches. In one embodiment, the flexible member is at least substantially air impermeable.

In an alternative embodiment, the flexible member may comprise an upper and lower portion with either the upper or lower portion having an increased or relatively high degree of air permeability, wherein the increased or high degree of air permeability is suitable to permit a desired amount of airflow, such as a sufficient amount of airflow to and from the cabinet to prevent breaded or bread-containing products stored within the cabinet from becoming soggy while still essentially maintaining the temperature of the cabinet at a desired level without requiring excessive or inefficient energy input. The flexible member may extend to the bottom of the cabinet or lower but preferably there will be sufficient airflow to prevent breaded or bread-containing products contained in the compartment from becoming soggy.

In a further embodiment, the entire flexible member may be sufficiently air permeable to permit sufficient airflow to and from the cabinet to prevent any breaded or bread-containing products from becoming soggy while still essentially maintaining the temperature of the cabinet.

The increased or high degree of air permeability can be in any suitable form, including, for example, perforations that may be large or small, or material that has a desired degree of air permeability.

In accordance with another aspect of the invention, a method for storing previously cooked food is provided. A staging device in accordance with the invention, such as one for holding a plurality of food is provided. Previously cooked food is placed into a compartment of the staging device. Typically, the food will be of a type that is battered, breaded, or is a bread item, which may be a biscuit, muffin or other item, for example. The previously cooked food is stored in the staging device for a period of time and removed when desired. Typically, the food will be placed in a suitable tray prior to placing the food in the compartment of the staging device.

In an alternative embodiment, the compartment may be further bound by a lower heated surface. In another embodiment, the staging device is configured to provide a gap between the flexible member and the bottom of the cabinet. This gap may be any size appropriate to allow a sufficient airflow into and out of the cabinet to prevent any breaded or bread-containing products from becoming soggy while still essentially maintaining the temperature of the cabinet.

In an alternative embodiment, the flexible member may comprise an upper and lower portion with either the upper or lower portion having a higher air permeability, wherein the higher air permeability is suitable to permit sufficient airflow to and from the cabinet to prevent any breaded or bread-containing products stored within the cabinet from becoming soggy while still essentially maintaining the temperature of the cabinet. The flexible member may extend to the bottom of the cabinet or lower so long as the airflow is sufficient to prevent any breaded or bread-containing products from becoming soggy.

In a further embodiment of the method, the entire flexible member may be sufficiently air permeable to permit sufficient airflow to and from the cabinet to prevent any breaded or bread-containing products from becoming soggy while still essentially maintaining the temperature of the cabinet.

In accordance with another aspect of the invention, a method for making a sandwich is provided. A staging device in accordance with the invention as previously described, for example, for holding a plurality of food portions is provided. Previously cooked food is placed into the compartment of the staging device, which may be contained on a tray that is also placed into the staging device. The previously cooked food is stored in the staging device for a period of time and subsequently removed. Typically, the food will be of a type that is battered, breaded, or is a bread item, which may be a biscuit, muffin or other item, for example. The previously cooked food thereafter is assembled together with another sandwich component or components to make a sandwich. The other component or components can be as desired. For example, if the food item stored in the staging device comprises meat, the other component or components may comprise a bread component. If the food item stored in the staging device is a bread component, the other component or components may comprise a biscuit, an English muffin or some other type of sandwich component. Optionally, additional sandwich ingredients are added to the previously cooked food or bread component to make a sandwich.

In an alternative embodiment of this method, the compartment may be further bounded by a lower heated surface. In another embodiment, the staging device further comprises a gap between the flexible member and the bottom of the cabinet. This gap may be any size appropriate to allow a sufficient airflow into and out of the cabinet to prevent any breaded or bread-containing products from becoming soggy while still essentially maintaining the temperature of the cabinet.

In an alternative embodiment, the flexible member may comprise an upper and lower portion with either the upper or lower portion having a higher air permeability, wherein the higher air permeability is suitable to permit sufficient airflow to and from the cabinet to prevent any breaded or bread-containing products stored within the cabinet from becoming soggy while still essentially maintaining the temperature of the cabinet. The flexible member may extend to the bottom of the cabinet or lower so long as the airflow is sufficient to prevent any breaded or bread-containing products from becoming soggy.

In a further embodiment, the entire flexible member may be sufficiently air permeable to permit sufficient airflow to and from the cabinet to prevent any breaded or bread-containing products from becoming soggy while still essentially maintaining the temperature of the cabinet.

In accordance with another aspect of the invention, a staging device for holding a plurality of food portions at a controlled temperature is provided which comprises at least one compartment for holding the food portions having a compartment height and bounded by an upper compartment surface, a refrigeration device for maintaining a controlled temperature in the compartment, a cabinet defining a volume that encloses the compartment therein including at least one slot for removing the food portions from the compartment, and a flexible member covering at least an upper portion of the slot, where the flexible member is readily deflectable to permit access to the interior of the compartment for removing items therefrom and limiting the amount of airflow into and out of the compartment In an alternative embodiment, the staging device is kept below ambient temperature. Alternatively, the staging device may be kept at refrigerated temperatures.

Typically, the compartment is further bounded by a lower surface. The staging device may further comprise at least one raised curb attached to the lower surface. The staging device may further comprise at least one tray for containing the food portions.

Typically, the staging device will further comprise a gap between the flexible member and the bottom of the cabinet. This gap may be of any suitable height to permit sufficient airflow to and from the cabinet to prevent any breaded or bread-containing products stored within the cabinet from becoming soggy. Typically, this gap is approximately two inches. In one embodiment, the flexible member is at least substantially air impermeable.

In still another embodiment, the flexible member may comprise an upper and lower portion with either the upper or lower portion having a higher air permeability, wherein the higher air permeability is suitable to permit sufficient airflow to and from the cabinet to prevent any breaded or bread-containing products stored within the cabinet from becoming soggy while still essentially maintaining the temperature of the cabinet. The flexible member may extend to the bottom of the cabinet or lower so long as the airflow is sufficient to prevent any breaded or bread-containing products from becoming soggy.

In a further embodiment, the entire flexible member may be sufficiently air permeable to permit sufficient airflow to and from the cabinet to prevent any breaded or bread-containing products from becoming soggy while still essentially maintaining the temperature of the cabinet.

BRIEF DESCRIPTION OF THE FIGURES

The accompanying drawings form part of the specification and like numerals are employed to designate like parts throughout the same.

DETAILED DESCRIPTION OF THE INVENTION

The present invention provides a staging device for holding a plurality of foods at an elevated temperature. Any suitable temperature required to maintain the temperature and quality of the foods stored within the staging device is appropriate. The staging device provides storage for food and is particularly suitable for storing breaded or otherwise fried foods.

Breaded foods include any foods containing flour or seasoned flour, covered or dusted with flour or seasoned flour, coated with liquid batter, or covered with a breading of crumbs, cornflakes, any other crunchy material, or any material or coating intended to give the food a crispier texture. Examples include breaded pieces of chicken, breaded pieces of fish, hotcakes, biscuits, muffins, buns, or pies.

Fried foods includes any food that is cooked by deep frying, pan frying, oven frying, pressure cooking, or any other method of cooking that produces foods with a crisp coating. Oven fried foods are actually baked, but produce a food with a crisp coating.

The staging device allows for food to be cooked prior to being served and stored within the staging device. The food stored in the staging device maintains its fresh and crispy texture and does not become soggy from storage in the staging device.

Figure 1:
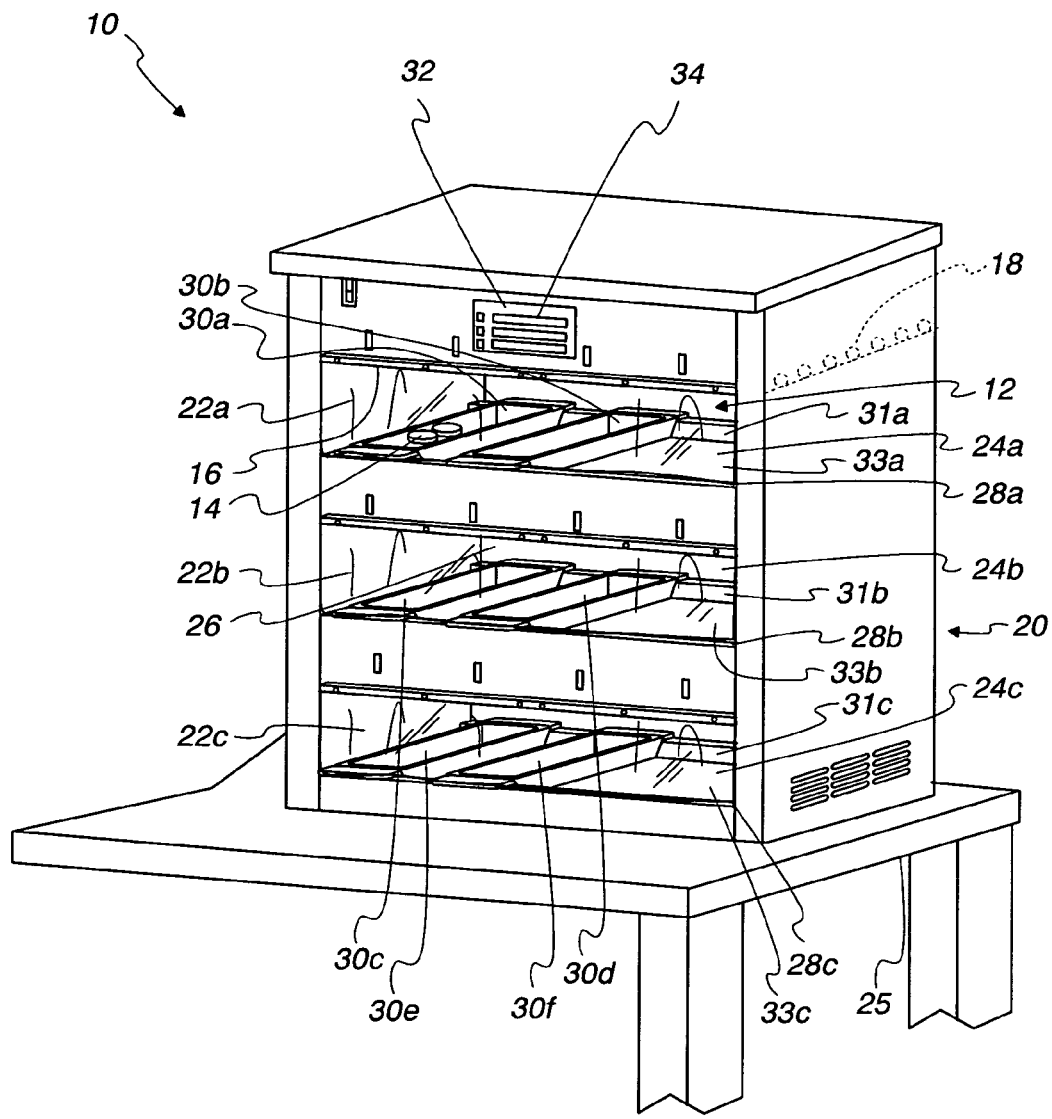
FIG. 1 is a perspective view of an embodiment of a staging device for holding a plurality of food portions at elevated temperatures.

Referring to the Figures generally, and in particular to FIG. 1, there is illustrated a view of one embodiment of a staging device 10. Staging device 10 comprises at least one compartment 12 for holding food portions bounded by an upper heated compartment surface 16, a heating device 18 for maintaining an elevated temperature in the compartment, a cabinet 20 defining a volume that encloses compartment 12 and therein including at least one slot 22a-c for removing food portions from compartment 12, and a flexible member 24a-c covering at least an upper portion of slot 22a-c. Typically, cabinet 20 is housed on top of a table 25. Table 25 can be any type of table or stand of appropriate size and strength to support cabinet 20.

Flexible member 24a-c is at least substantially air impermeable and is readily deflectable to permit access to the interior 26 of compartment 12 for removing items therefrom. Flexible member 24a-c further limits the amount of airflow into and out of compartment 12. Flexible member 24a-c is attached by any available means to compartment 12. Flexible member 24a-c covers a large portion of slot 22a-c, leaving a gap 28a-c in between the bottom of flexible member 24a-c and the bottom of compartment 12.

Gap 28a-c permits an amount of airflow into and out of compartment 12. This airflow allows for the storage of breaded or fried foods in staging device 10 without becoming soggy. The breaded or fried foods maintain their fresh and crispy quality during storage in staging device 10.

Gap 28a-c can be any suitable height and size so as to permit sufficient airflow into and out of staging device 10 to prevent the stored foods from becoming soggy. Gap 28a-c can be from approximately 0.5 inches to 4 inches high. Preferably, gap 28a-c is approximately 2 inches high for a compartment having a total height in the range of from about 5 inches to about 7 inches.

Staging device 10 further comprises at least one tray 30a-f. Tray 30a-f will hold any food stored in staging device 10. Tray 30a-f can be any suitable material such as plastic or metal. Typically, tray 30a-f will be a metal tray. Preferably, tray 30a-f will be aluminum, allowing for a quick transfer of heat to the food product being stored. Additionally, tray 30a-f will comprise ridges in the bottom of the tray, minimizing the contact between the food product and tray 30a-f. Tray 30a-f may further comprise a radio frequency identification (RFID) tag.

Tray 30a-f can be any suitable dimensions to fit into staging device 10. Typically, tray 30a-f are sized to easily fit into any one of slots 22a-c. Typically, flexible member 24a-c will extend to be within approximately two inches of the top of tray 30a-f. Preferably, flexible member 24a-c will extend beyond the top of tray 30a-f. Staging device 10 may further comprise at least one raised curb 31a-c attached to lower surface 33a-c.

Staging device 10 may further comprise a microprocessor controlled and driven display screen 32. Display screen 32 can be any type of screen that will indicate the amount of time a tray has been in staging device 10. Typically, display screen 32 will be a touch-screen interface 34 that will allow the user to quickly see the status of the contents of the staging device without having a unique display for each tray position. In one embodiment, indicators of different colors, brightness, or duplicity will identify trays that contain food that is approaching the end of its allowable holding time. Additionally, the food contents of each tray 30 a-f may be displayed on display screen 32. Display screen 32 can also be quickly programmed with touch-screen interface 34. Alternatively, display screen 32 can be programmed with a personal data assistant or other external device. Such microprocessor controlled touch-screen interfaces and other displays that are programmable are well known in the art. Consequently, a detailed description of such devices is not provided herein.

Slot 22a-c is equipped with RF sensors (antennae) to detect the signal from an RFID transponder device or tag, which is an RFID integrated circuit in tray 30 and to activate the timers. In a second mode, tray 30 has an RF identifier that is recognized by a controller. The controller recognizes the RF tag that is associated with a particular food to be heated at a pre-programmed temperature for a preprogrammed time. In this mode when tray 30 is placed in one of slots 22a-c, a timer automatically starts, and food is maintained and kept warm at a preprogrammed temperature of the compartment or slot. In another mode the slot is at a particular temperature, and the controller will send a warning to the user if they insert a tray that requires a different temperature set point. The user would then have to insert the tray into another slot. Touch screen 34 permits cabinet 20 to be changed from one mode to another. Additionally, touch screen 34 permits changing between "Breakfast" and "Lunch" modes. There could also be other menus that it can convert to as well for special seasonal food items.

Touch screen 34 displays particular foods in slots of cabinet 20 to permit the operator to read the status and location of the food in the respective trays. Touch screen 34 shows the amount of time that each tray 30 has been held along with all other pertinent information about the food product in the tray. Touch screen 34 provides a physical representation of cabinet 20 to readily inform the user of the contents of each tray and the tray status and shows the status of the cabinet without having a separate/unique display for each tray position. Presently, "first in" tray identification is used, which is not always functional. On occasion, the contents of a later inserted tray may expire prior to the contents of a previously inserted tray and inhibit the operator from properly planning replacement product. The programming capability does not require a Personal Data Assistant (PDA) or other external devices. In other embodiments, indicators using different colors, brightness, or duplicity identify trays that contain foods that are approaching the end of their useful shelf life.

Figure 4:
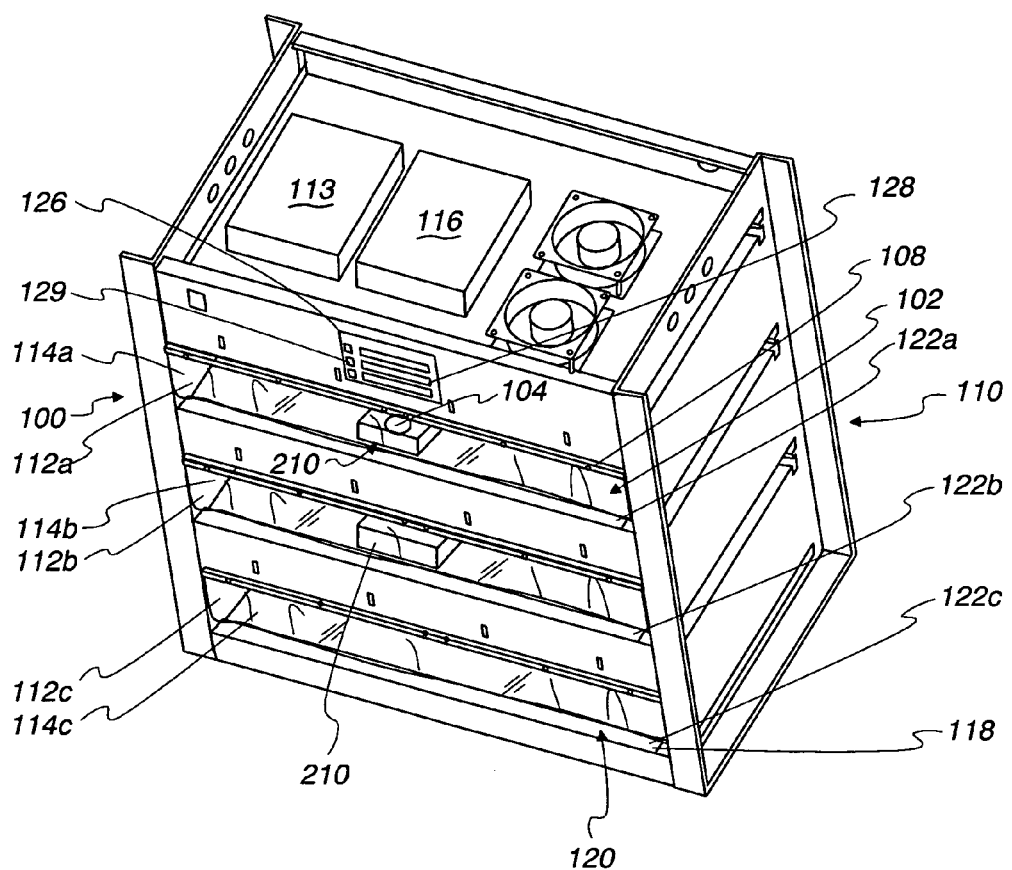
FIG. 4 is a perspective view of another embodiment of the staging device in accordance with the invention.

In FIG. 4, main controller 113 controls all aspects of the cabinet operation including storing all user inputted information regarding food type, food temperature and heating times. Main controller 113 controls the upper heating device 108 and the lower heating device 118 of each slot independently. Upper heating device 108 in a given slot will be rated at 750 to 1000 W. Lower heating device 118 in a given slot may typically, for example, be rated at 300 to 600 W. While these ratings are provided, other parameters could be used depending on cooking specifications without limiting functionality. Main controller 113 regulates the heaters with 1000 ohm RTDs, although other sensors could be used and specifically designed relays called triacs, for example.

Main controller 113 also interfaces with RFID controller 116 to control timing in each slot 112a-c. For example, RFID controller 116 will supply the information through a 9-pin RS-232 port on the status of the tray in each of the sixteen positions. In operation, on each side of cabinet 110, trays are being inserted from the front and from the back by a user. In one embodiment, if desired, a user partially pulls tray 210 out of slot 112a-c, the timers would, in the absence of sensors, turn off and the food would not continue to be warmed. A time delay may be included, before activation of this feature, if it is present. However, the RF sensors allow the timing and heating to continue when tray 210 is placed back in slot 112a-c. Even if tray 210 is partially removed the timers will not inadvertently shut off. Tray position can be detected up to 1" away, for example. Main controller 113 is able to monitor the time elapsed on each individual tray that has been inserted, the automatic starting and stopping of timers, and programming of all features through touch screen technology. If desired, a particular tray with a RFID tag can be moved from compartment to compartment, or even to different storage devices, and the RFID system can track the location of the tray and its contents.

The time expired on each tray is denoted with light emitting diodes 129 (LEDs) that are also shown on the touch screen interface 128. Other than the simple LEDs 129, there are no displays on each individual slot 112 a-c. The LEDs 129 operate to inform a user of tray status. For example, when tray 210 is inserted, the timer for that position is to start and a green LED 129 illuminates. Green LED 129 is bright if it is signaling the only tray of that product. When tray 210 is partially out (partially inserted or removed), the timer is to continue running for that particular slot 112 a-c. Screen 126 shows an error message for that position and a buzzer will have a steady tone to differentiate from the pulsing sound of product expiration. When tray 210 is completely removed, the timer for that slot is stopped. Controller 113 will switch the bright LED 129 to the next first-in-first-out tray for that product. The product in the left-most column determines the hold temperatures for that slot.

In each mode the LED colors indicate the remaining length of time of a food before it expires. The LED color Green may indicate approximately from 100% usable product life to, for example, a desired percent of usable life, for example, 26% usable life remaining, and LED color Yellow would indicate approximately 25% usable life remaining to expired. These percentages are approximate ranges. The LEDs are located at each tray position. The green LED is on top and the yellow LED is on bottom for each position. Both green and yellow LEDs blink and the buzzer will sound (0.5 sec on/0.5 sec off) when food product expires, or if the temperature falls 10° F. below setpoint, or if the temperature is 10° F. above setpoint for each location. Each position of slot 112a-c is identified with a file, such as a .jpg file, that shows a picture of the food product, the RFID tag of the tray and the time remaining. The screen will also have a background color that is the same as the LED identifier at the actual tray position. The audible alarm to indicate expiration may have a sound pressure level as desired, such as from approximately 70 to 95 dB at 12", for example.

The RF sensing capability in cabinet 110, controlled by RFID controller 116, allows the automatic detection of tray position and insertion time. By eliminating the human interaction during tray insertion and removal, food product quality is assured. The controller 113 senses the tray location and automatically starts the timing operation when the tray is inserted, and stops timing when the tray is removed. The automatic detection capability eliminates the need for an operator to manually start a timer and a timer switch that could malfunction. Additionally, identifiers in the tray signal to the cabinet what food product is in the tray.

Figure 2:
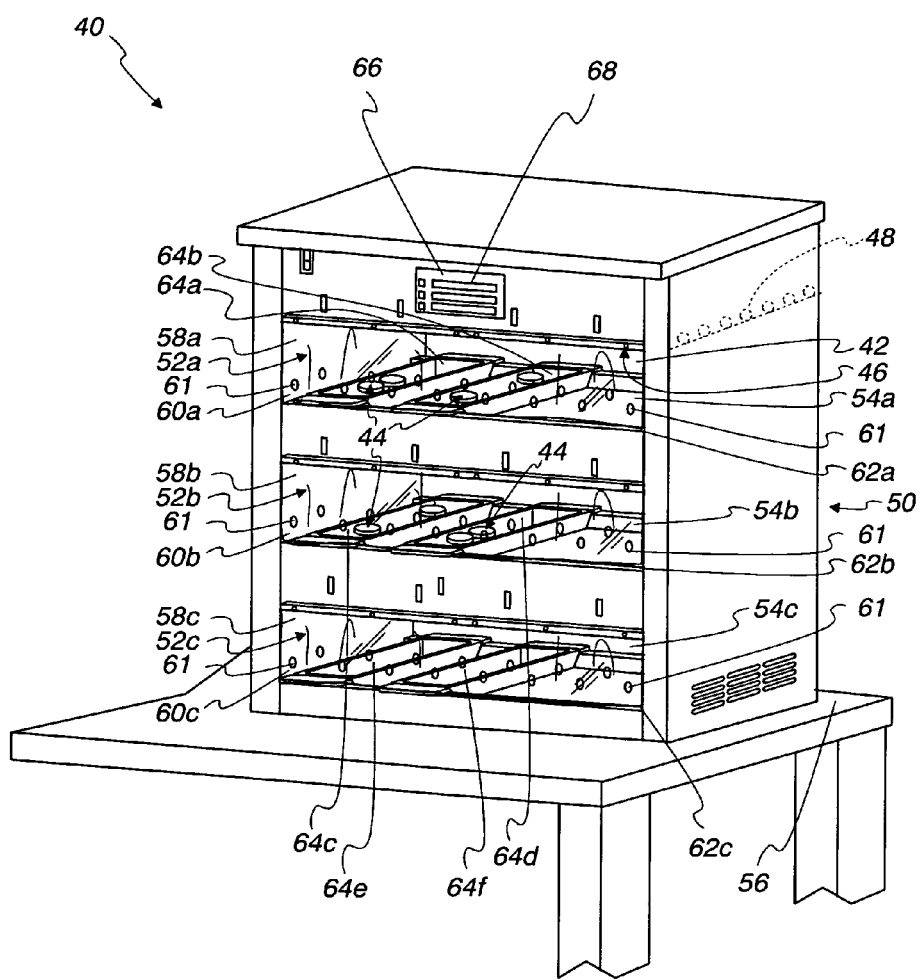
FIG. 2 is a perspective view of another embodiment of the staging device in accordance with the invention.

An alternative embodiment staging device 40 is illustrated in FIG. 2. Staging device 40 comprises at least one compartment 42 for holding food portions bounded by an upper heated compartment surface 46, a heating device 48 for maintaining an elevated temperature in the compartment, a cabinet 50 defining a volume that encloses compartment 42 and therein including at least one slot 52a-c for removing food portions from compartment 42, and a flexible member 54a-c covering at least an upper portion of slot 52a-c. Typically, cabinet 50 is housed on top of a table 56. Table 56 can be any type of table or stand of appropriate size and strength to support cabinet 50. Flexible members 54a-c each have a plurality of perforations 61 to permit airflow to and from compartment 42.

Flexible member 54a-c is readily deflectable to permit access to the interior of compartment 42 for removing items therefrom. Flexible member 54a-c further limits the amount of airflow into and out of compartment 42. Flexible member 54a-c is attached by any available means to compartment 42. Flexible member 54a-c covers the majority of slot 52a-c, leaving no appreciable gap between flexible member 54a-c and the bottom of compartment 42.

Flexible member 54a-c comprises an upper portion 58a-c and a lower portion 60a-c. Upper portion 58a-c is at least substantially air impermeable. Lower portion 60a-c is air permeable, allowing a sufficient amount of air to pass through lower portion perforations 61 as shown in FIG. 2 such that breaded and fried products can be stored in compartment 42 without becoming soggy. Air is allowed to permeate through lower portion 60a-c in order to maintain fresh and crispy food in compartment 42 of staging device 40.

Flexible member 54a-c may cover all of slot 52a-c. Alternatively, flexible member 54a-c may cover a large portion of slot 52a-c, leaving a gap 62a-c in between the bottom of flexible member 54a-c and the bottom of compartment 42.

Gap 62a-c permits an amount of airflow into and out of compartment 42. This airflow allows for the storage of breaded or fried foods in staging device 40 without becoming soggy. The breaded or fried foods maintain their fresh and crispy quality during storage in staging device 40.

Gap 62a-c can be any suitable height and size so as to permit sufficient airflow into and out of staging device 40 to prevent the stored foods from becoming soggy. Typically, gap 62a-c can be up to approximately 4 inches for a compartment height of up to about 7 inches. Preferably, gap 62a-c is up to approximately 2 inches high for a compartment in the height range of from about 5 inches to about 7 inches.

Staging device 40 further comprises at least one tray 64 a-f. Tray 64 a-f will hold any food stored in staging device 40.

Tray 64 *a-f* can be any suitable material such as plastic or metal. Typically, tray 64 *a-f* will be a metal tray. Preferably, tray 64 *a-f* will be aluminum, allowing for a quick transfer of heat to the food product being stored. Additionally, tray 64 *a-f* will comprise ridges in the bottom of the tray, minimizing the contact between the food product and tray 64 *a-f*. Tray 64*a-f* may further comprise an RFID tag.

Tray 64 *a-f* can be any suitable dimensions to fit into staging device 40. Typically, trays 64*a-f* are sized to easily fit into slot 52 *a-c*. Typically, flexible member 54 *a-c* will extend to be within approximately two inches of the top of tray 64 *a-f*. Preferably, flexible member 54 *a-c* will extend at least slightly beyond the top of tray 64 *a-f*. Thus, for a compartment height of from about 5 inches to about 7 inches and a gap as described previously of about 2 inches, the tray should preferably be at least slightly greater than 2 inches.

Staging device 40 may further comprise a display screen 66. Display screen 66 can be any type of screen that will indicate the amount of time a tray has been in staging device 40. Typically, display screen 66 will be a touch-screen interface 68 that will allow the user to quickly see the status of the contents of the staging device without having a unique display for each tray position. In one embodiment, indicators of different colors, brightness, or duplicity will identify trays that contain food that is approaching the end of its allowable holding time. Additionally, the food contents of each tray 64*a-f* may be displayed on display screen 66. Display screen 66 can also be quickly programmed with touch-screen interface 68. Alternatively, display screen 66 can be programmed with a personal data assistant or other external device.

Figure 3:
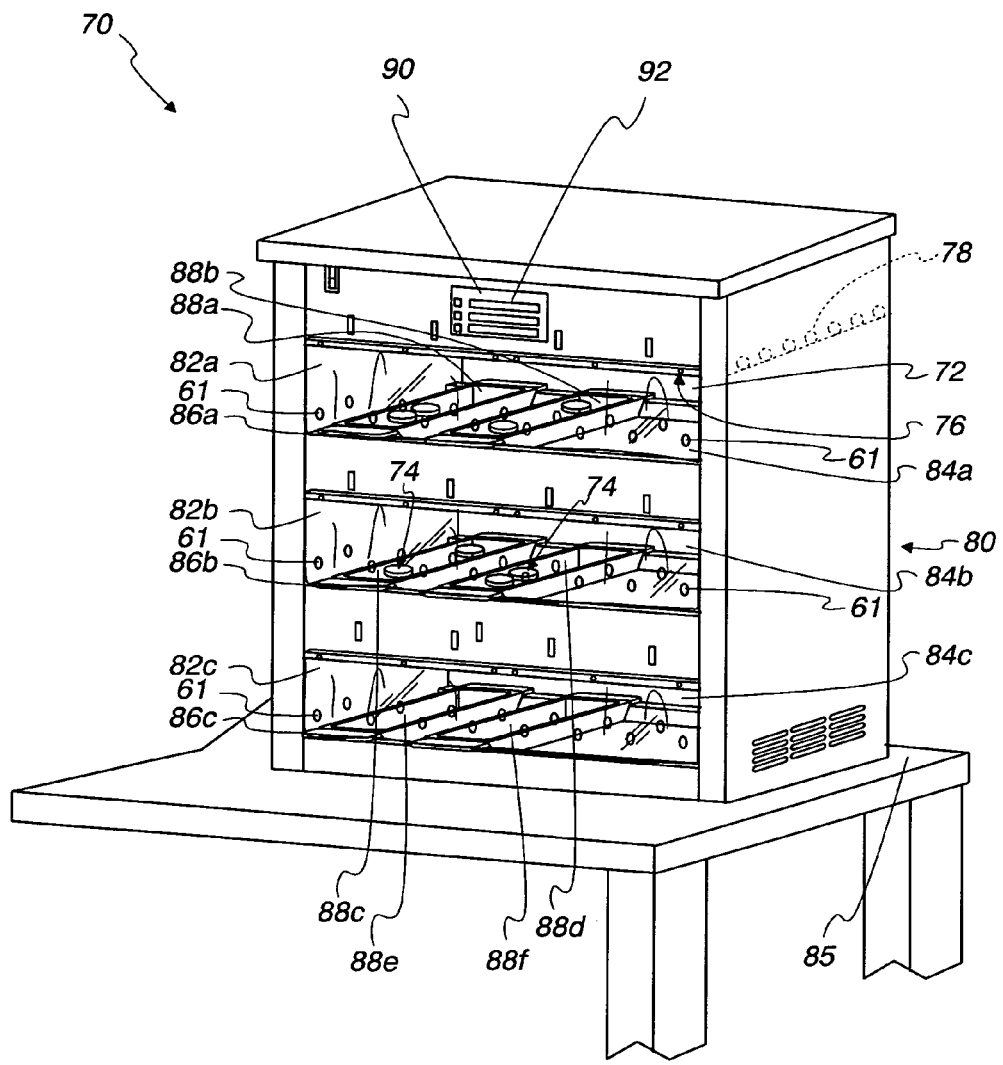
FIG. 3 is a perspective view of another embodiment of the staging device in accordance with the invention.

An alternative embodiment staging device 70 is illustrated in FIG. 3. Staging device 70 comprises at least one compartment 72 for holding food portions bounded by an upper heated compartment surface 76, a heating device 78 for maintaining an elevated temperature in the compartment, a cabinet 80 defining a volume that encloses compartment 72 and therein including at least one slot 82*a-c* for removing food portions from compartment 72, and a flexible member 84*a-c* covering at least an upper portion of slot 82*a-c*. Typically, cabinet 80 is housed on top of a table 85. Table 85 can be any type of table or stand of appropriate size and strength to support cabinet 80.

Flexible member 84*a-c* is readily deflectable to permit access to the interior of compartment 72 for removing items therefrom. Flexible member 84*a-c* further limits the amount of airflow into and out of compartment 72. Flexible member 84*a-c* is attached by any available means to compartment 72. Flexible member 84*a-c* may cover some or all of slot 82*a-c*, leaving gap 86*a-c*. Typically, flexible member 84*a-c* covers the majority of slot 82*a-c*, leaving no appreciable gap 86*a-c* between flexible member 84*a-c* and the bottom of compartment 72.

Gap 86*a-c* can be any suitable height and size so as to permit sufficient airflow into and out of staging device 70 to prevent the stored foods from becoming soggy. Gap 86*a-c* can be up to approximately 4 inches. Typically, gap 86*a-c* is no more than approximately 2 inches high.

Flexible member 84 *a-c* is air permeable, allowing a sufficient amount of air to pass through perforations 61 as shown in FIG. 3 such that breaded and fried products can be stored in compartment 72 without becoming soggy. Air is allowed to permeate through flexible member 84 *a-c* in order to maintain fresh and crispy food in compartment 72 of staging device 70.

Staging device 70 further comprises at least one tray 88*a-f*. Tray 88*a-f* will hold any food stored in staging device 70. Tray 88*a-f* can be any suitable material such as plastic or metal. Typically, tray 88*a-f* will be a metal tray. Preferably, tray 88*a-f* will be aluminum, allowing for a quick transfer of heat to the food product being stored. Additionally, tray 88*a-f* will comprise ridges in the bottom of the tray, minimizing the contact between the food product and tray 88*a-f*. Tray 88*a-f* may further comprise an RFID tag.

Tray 88 *a-f* can be any suitable dimensions to fit into staging device 70. Typically, trays 88*a-f* are sized to easily fit into slot 82 *a-c*. Typically, flexible member 84 *a-c* will extend to be within approximately 2 inches of the top of tray 88 *a-f*. Preferably, flexible member 84*a-c* will extend beyond the top of tray 88 *a-f*.

Staging device 70 may further comprise a display screen 90. Display screen 90 can be any type of screen that will indicate the amount of time a tray has been in staging device 70. Typically, display screen 90 will be a touch-screen interface 92 that will allow the user to quickly see the status of the contents of the staging device without having a unique display for each tray position. In one embodiment, indicators of different colors, brightness, or duplicity will identify trays that contain food that is approaching the end of its allowable holding time. Additionally, the food contents of each tray 88 *a-f* may be displayed on display screen 90. Display screen 90 can also be quickly programmed with touch-screen interface 92. Alternatively, display screen 90 can be programmed with a personal data assistant or other external device.

An additional embodiment staging device 100 is illustrated in FIG. 4. Staging device 100 comprises at least one compartment 102 for holding food portions bounded by an upper compartment surface, an upper heating device 108 for maintaining an elevated temperature in the compartment, a cabinet 110 defining a volume that encloses compartment 102 and therein including at least one slot 112*a-c* for removing food portions from compartment 102, a flexible member 114*a-c* covering at least an upper portion of slot 112*a-c*, a main controller 113 for controlling all aspects of the cabinet operation, and an RFID controller 116. Typically, staging device 100 is housed on top of a table. The table can be any type of table or stand of appropriate size and strength to support cabinet 100. Staging device 100 may further comprise a lower heating device 118.

Flexible member 114*a-c* is at least substantially air impermeable and is readily deflectable to permit access to the interior 120 of compartment 102 for removing items therefrom. Flexible member 114*a-c* further limits the amount of airflow into and out of compartment 102. Flexible member 114*a-c* is attached by any available means to compartment 102. Flexible member 114*a-c* covers a large portion of slot 112*a-c*, leaving a gap 122*a-c* in between the bottom of flexible member 114*a-c* and the bottom of compartment 102. Gap 122*a-c* permits an amount of airflow into and out of compartment 102. This airflow allows for the storage of breaded or fried foods in staging device 100 without becoming soggy. The breaded or fried foods maintain their fresh and crispy quality during storage in staging device 100.

Gap 122*a-c* can be any suitable height and size so as to permit sufficient airflow into and out of staging device 100 to prevent the stored foods from becoming soggy. Gap 122*a-c* can be from approximately 0.5 inches to 4 inches high. Typically, gap 122*a-c* is approximately 2 inches high.

Staging device 100 further comprises at least one tray 210. Tray 210 will hold any food stored in staging device 100. Tray 210 can be any suitable material such as plastic or metal. Typically, tray 210 will be a metal tray. Preferably, tray 210 will be aluminum, allowing for a quick transfer of heat to the food product being stored. Additionally, tray 210 will comprise ridges in the bottom of the tray, minimizing the contact between the food product and tray 210. Tray 210 may further comprise an RFID tag.

Tray 210 can be any suitable dimensions to fit into staging device 100. Typically, trays 210 are sized to easily fit into slot 112a-c. Typically, flexible member 114a-c will extend to be within approximately 2 inches of the top of tray 210. Preferably, flexible member 114a-c will extend beyond the top of tray 210.

Staging device 100 may further comprise a display screen 126. Display screen 126 can be any type of screen that will indicate the amount of time a tray has been in staging device 100. Typically, display screen 126 will be a touch-screen interface 128 that will allow the user to quickly see the status of the contents of the staging device without having a unique display for each tray position. In one embodiment, indicators of different colors, brightness, or duplicity will identify trays that contain food that is approaching the end of its allowable holding time. Additionally, the food contents of each tray 210 may be displayed on display screen 126. Display screen 126 can also be quickly programmed with touch-screen interface 128. Alternatively, display screen 126 can be programmed with a personal data assistant or other external device. The time expired on each tray is denoted with light emitting diodes 129 (LEDs) that are also shown on touch-screen interface 128.

Figure 5:
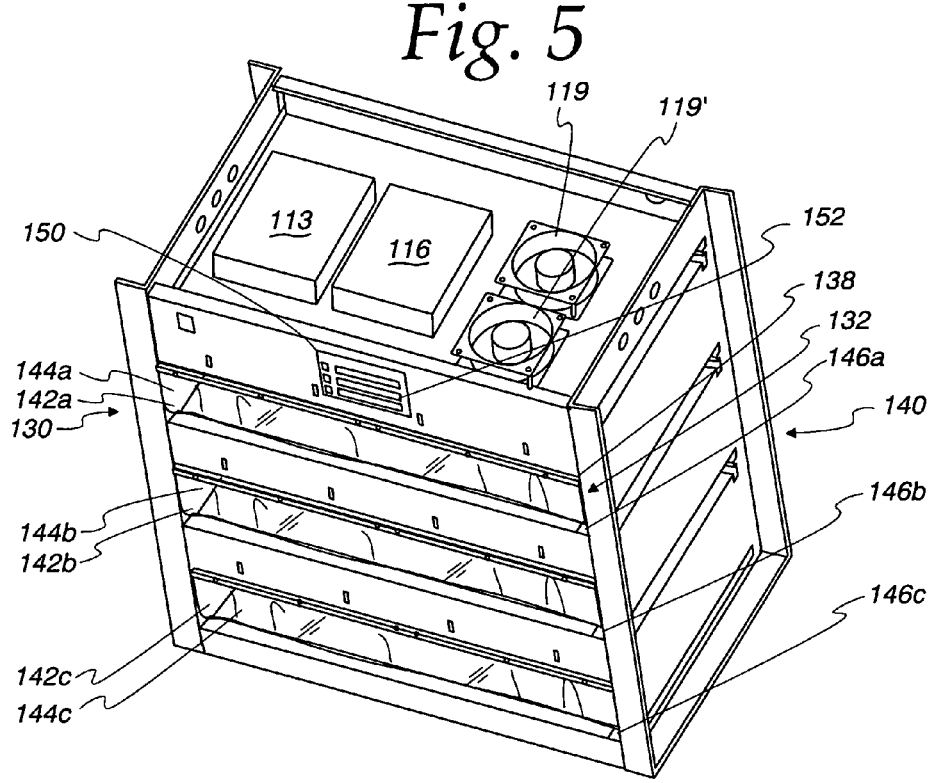
FIG. 5 is a perspective view of another embodiment of the staging device in accordance with the invention.

An additional embodiment staging device 130 is illustrated in FIG. 5. Staging device 130 comprises at least one compartment 132 for holding food portions bounded by an upper compartment surface, a refrigeration/cooling device 138 for maintaining a controlled temperature in the compartment, a cabinet 140 defining a volume that encloses compartment 132 and therein including at least one slot 142a-c for removing food portions from compartment 132, and a flexible member 144a-c covering at least an upper portion of slot 142a-c. Staging device 130 is housed on top of a table. The table can be any type of table or stand of appropriate size and strength to support staging device 130. Staging device 130 may further comprise a lower refrigeration device. Cooling fans 119 and 119' may be provided to cool cabinet 140.

Flexible member 144a-c is at least substantially air impermeable and preferably is at least substantially transparent and is readily deflectable to permit access to the interior of compartment 132 for removing items therefrom. Flexible member 144a-c further limits the amount of airflow into and out of compartment 132. Flexible member 144a-c is attached by any available means to compartment 132. Flexible member 144a-c covers a large portion of slot 142a-c, leaving a gap 146a-c in between the bottom of flexible member 144a-c and the bottom of compartment 132. Gap 146a-c permits an amount of airflow into and out of compartment 132. This airflow allows for the storage of breaded or fried foods in staging device 130 without becoming soggy. The breaded or fried foods maintain their fresh and crispy quality during storage in staging device 130. Flexible members 144a-c can be made of any suitable material and can be, for example, made of PTFE (polytetrafluoroethylene), sold commercially under the Teflon® trademark of DuPont. As shown in FIGS. 1-4, food portions 14, 44, 74 and 104 are contained in respective trays 30a-f, 64a-f, 88a-f and 210.

Figure 7:
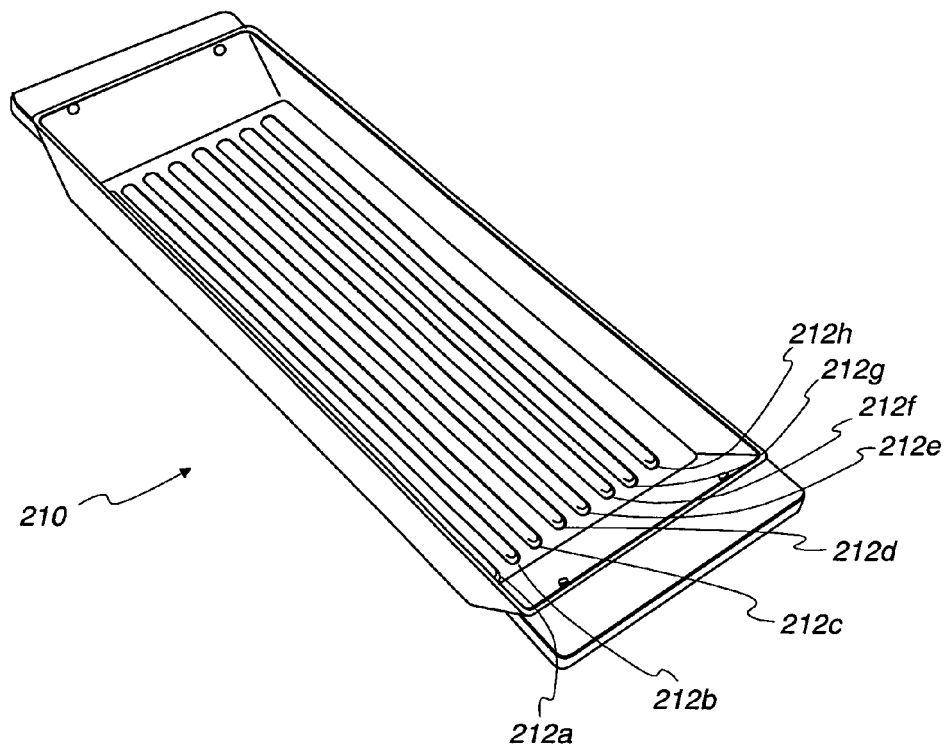
FIG. 7 is a perspective view illustrating a tray used with the staging device in accordance with the invention.

Staging device 130 further may contain at least one suitable container for holding food items. Any suitable container can be used, which may be, for example, a tray, a plate, a sheet or other receptacle. One particularly suitable container is a tray such as tray 210. Tray 210 can hold any desired type of food stored in staging device 130. Tray 210 can be any suitable material such as paper, paperboard, cardboard, plastic or metal. Typically, tray 210 will be a metal tray. Preferably, tray 210 will be aluminum, allowing for a quick transfer of heat to the food product being stored. Additionally, tray 210 may comprise a plurality of ridges 212a-h in the bottom of the tray, minimizing the contact between the food product and tray 210. Typically, a tray will contain at least three ridges that can be longitudinal, as illustrated in FIG. 7, or the ridges can extend transversely. Typical and preferred ridge dimensions are about as follows

|  | Maximum Height | Total Ridge Width | Spacing Between Ridges |
| --- | --- | --- | --- |
| Typical | About 1/16-1/4" | 1/8-1/2 inch | 1/4-1 1/4 inch |
| Preferred | about 1/8 inch | 1/4 inch | 3/4 inch |

The ridge cross-sectional shape may be as desired, such as, for example, a half-circle, a half oval, curved ridge sides with a generally flat or planar central area and others as desired.

The ridges allow for airflow under the food products stored therein, helping to prevent the food from becoming soggy. The ridges may be formed by any suitable process, which can be by molding or stamping, for example. The exterior bottom of the tray may have depressions therein as a result of ridge formation. If the tray is aluminum, good heat transfer is obtained even with depressions on the bottom, since aluminum is a good heat conductor and heat can be conducted through the ridges into the food items that are in contact with the ridges, for example. The outside bottom tray surface should complement the compartment surface for good heat transfer (i.e., a flat overall tray bottom for a flat compartment. Tray 210 may further comprise an RFID tag.

Tray 210 can be any suitable dimensions to fit into staging device 130. Typically, trays 210 are sized to easily fit into slot 142a-c. Typically, flexible member 144a-c will extend to be within approximately 2 inches of the top of tray 210. Preferably, flexible member 144a-c will extend beyond the top of tray 210.

Staging device 130 may further comprise a display screen 150. Display screen 150 can be any type of screen that will indicate the amount of time a tray has been in staging device 130. Typically, display screen 150 will be a touch-screen interface 152 that will allow the user to quickly see the status of the contents of the staging device without having a unique display for each tray position. In one embodiment, indicators of different colors, brightness, or duplicity will identify trays that contain food that is approaching the end of its allowable holding time. Additionally, the food contents of each tray 210 may be displayed on display screen 150. Display screen 150 can also be quickly programmed with touch-screen interface 152. Alternatively, display screen 150 can be configured to be programmed with a personal data assistant or other external device.

Figure 5A:
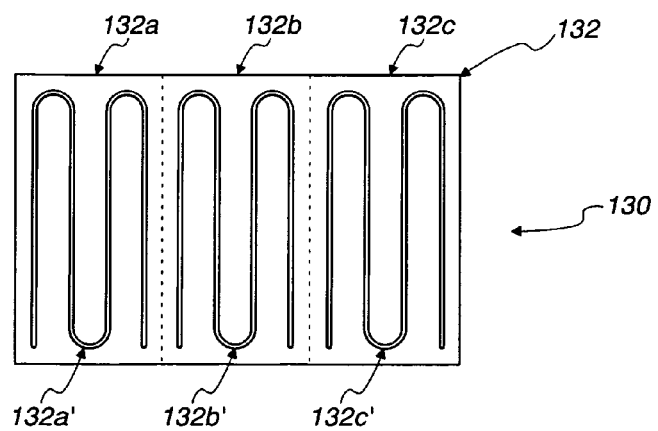
FIG. 5A is a plan schematic view of a portion of the staging device of FIG. 5.

The staging devices of the invention can have heating elements or cooling elements as desired. For example, the heating element can be electric resistive or radiant heating elements and in differing configurations as desired. For example, an electric resistive element can be used for heating a bottom compartment surface and a radiant heating element can be used to provide heat above the food or along the top of a particular compartment. Each compartment can be divided into separate heating zones as desired. For example, as shown in FIG. 5A, compartment 132 of staging device 130 is divided into three zones, 132a-c. Each zone 132a-c is configured to receive an associated tray, such as tray 210. Each zone 132a-c has a separate heating element or elements, 132*a'-c'* associated with its respective zone and can be controlled independently of the other heating elements. In this manner, zone 132*a* of compartment 132 may be of a different temperature from zone 132*b*.

Figure 6:
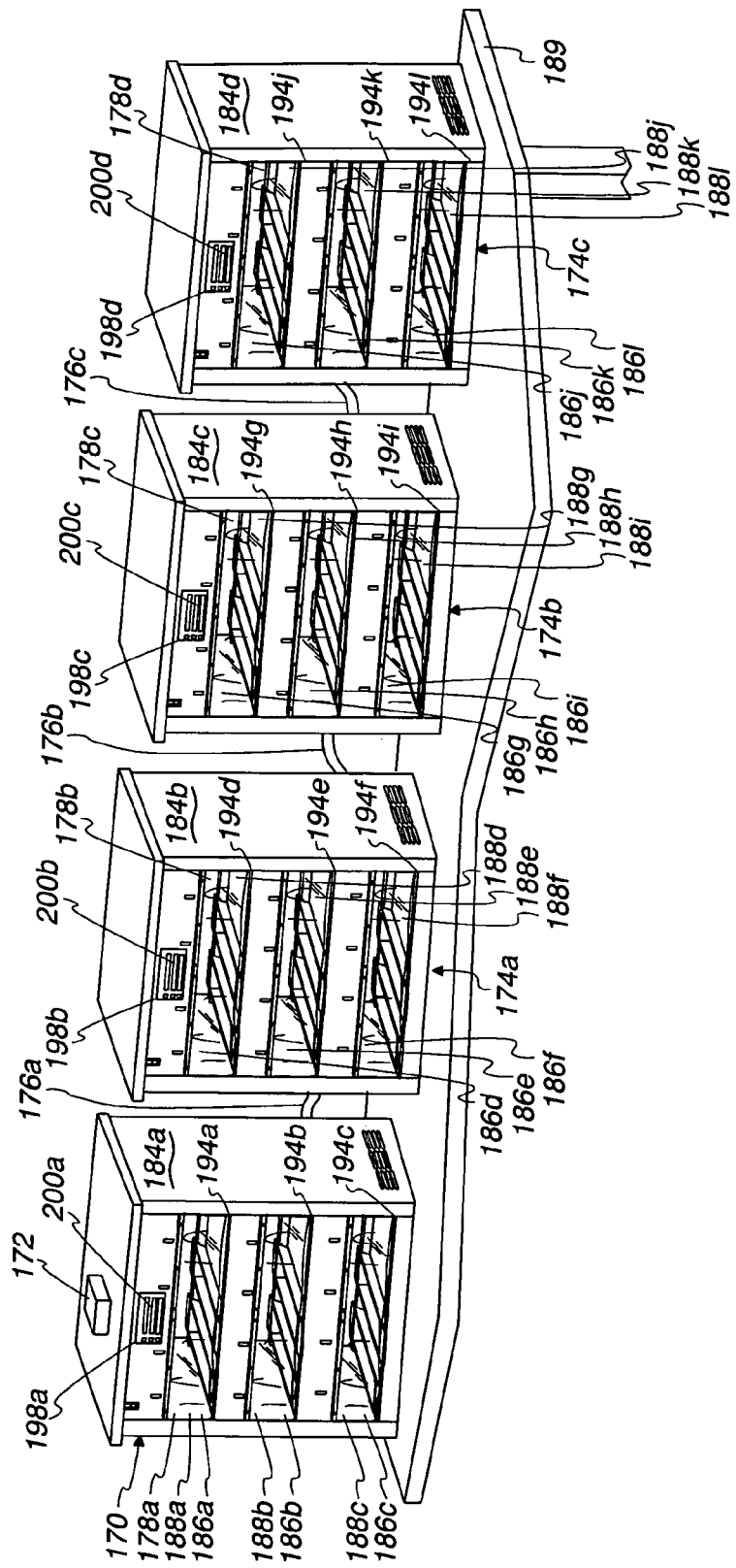
FIG. 6 is a perspective view of another embodiment of the staging device in accordance with the invention.

An additional embodiment of staging device 10 is illustrated in FIG. 6. Main staging device 170 comprises a control system 172 which controls main staging device 170 and satellite staging devices 174*a-c*. Satellite staging devices 174*a-c* are connected directly to main staging device 170 by a cord 176*a-c* and controlled by control system 172. Any suitable type of cord or cable may be utilized. Satellite staging devices 174*a-c* can also be connected in series to each other, with one satellite staging device 174*a-c* directly connected to main staging device 170.

Main staging device 170 and satellite staging devices 174*a-c* comprise at least one compartment 178*a-d* for holding food portions bounded by an upper compartment surface, a heating device for maintaining a controlled temperature in compartment 178*a-d*, a cabinet 184*a-d* defining a volume that encloses compartment 178*a-d* and therein including at least one slot 186*a-l* for removing food portions from compartment 178*a-d*, and a flexible member 188*a-l* covering at least an upper portion of slot 186*a-l*.

Typically, cabinet 184*a-d* is housed on top of a table 189. Table 189 can be any type of table or stand of appropriate size and strength to support cabinet 184*a-d*. Main staging device 170 and satellite staging devices 174*a-c* may further comprise a lower heating element. Flexible member 188*a-l* is at least substantially air impermeable and is readily deflectable to permit access to the interior of compartment 178*a-d* for removing items therefrom. Flexible member 188*a-l* further limits the amount of airflow into and out of compartment 178*a-d*. Flexible member 188*a-l* is attached by any available means to compartment 178*a-d*. Flexible member 188*a-1* covers a large portion of slot 186*a-l*, leaving a gap 194*a-l* in between the bottom of flexible member 188*a-l* and the bottom of compartment 178*a-d*. Gap 194*a-l* permits an amount of airflow into and out of compartment 178*a-d*. This airflow allows for the storage of breaded or fried foods in staging devices 170 and 174*a-c* without becoming soggy. The breaded or fried foods maintain their fresh and crispy quality during storage in main staging device 170 and satellite staging devices 174*a-c*.

Main staging device 170 and satellite staging devices 174*a-c* may contain at least one tray 210. Tray 210 will hold any food stored in main staging device 170 and satellite staging devices 174*a-c*. Tray 210 can be any suitable material such as plastic or metal. Typically, tray 210 will be a metal tray. Preferably, tray 210 will be aluminum, allowing for a quick transfer of heat to the food product being stored. Additionally, tray 210 may comprise ridges in the bottom of the tray, minimizing the contact between the food product and tray 210.

Tray 210 can be any suitable dimension to fit into main staging device 170 and satellite staging devices 174*a-c*. Typically, trays 210 are sized to easily fit into slot 186*a-l*. Typically, flexible member 188*a-l* will extend to be within approximately 2 inches of the top of tray 210. Preferably, flexible member 188*a-l* will extend beyond the top of tray 210.

Main staging device 170 may further comprise a display screen 198*a-d*. Display screen 198*a-d* can be any type of screen that will indicate the amount of time a tray has been in main staging device 170 and in satellite staging device 174*a-c*. Typically, display screen 198*a-d* will be a touch-screen interface 200*a-d* that will allow the user to quickly see the status of the contents of main staging device 170 and satellite staging device 174*a-c* without having a unique display for each tray position. In one embodiment, indicators of different colors, brightness, or duplicity will identify trays that contain food that is approaching the end of its allowable holding time. Additionally, the food contents of each tray 210 may be displayed on display screen 198*a-d*. Display screen 198*a-d* can also be quickly programmed with touch-screen interface 200*a-d*. Alternatively, display screen 198*a-d* can be programmed with a personal data assistant or other external device.

FIG. 7 illustrates a tray that can be used in the present invention. Tray 210 can be any suitable dimension to fit into a staging device. Typically, the length of tray 210 will be the same as the depth of a staging device, allowing tray 210 to fit snugly within a staging device without moving when food is being placed into or removed from tray 210.

Tray 210 can be any suitable material such as plastic or metal. Typically, tray 210 will be a metal tray. Preferably, tray 210 will be aluminum, allowing for a quick transfer of heat to the food product being stored. Additionally, tray 210 will comprise ridges 212*a-h* in the bottom of the tray 210, minimizing the contact between the food product and tray 210.

Tray 210 can further comprise an RFID tag to be used in conjunction with a staging device with an RFID reader and controller. Any RFID tag or reader that will allow a staging device to read the RFID tag of tray 210 can be used. A staging device controller may be able to auto-detect tray 210 and tray position and insertion time. A controller senses tray location and automatically activates and runs the timing process when a particular tray is inserted. A controller can recognize an RFID tag that has been pre-programmed.

Figure 8:
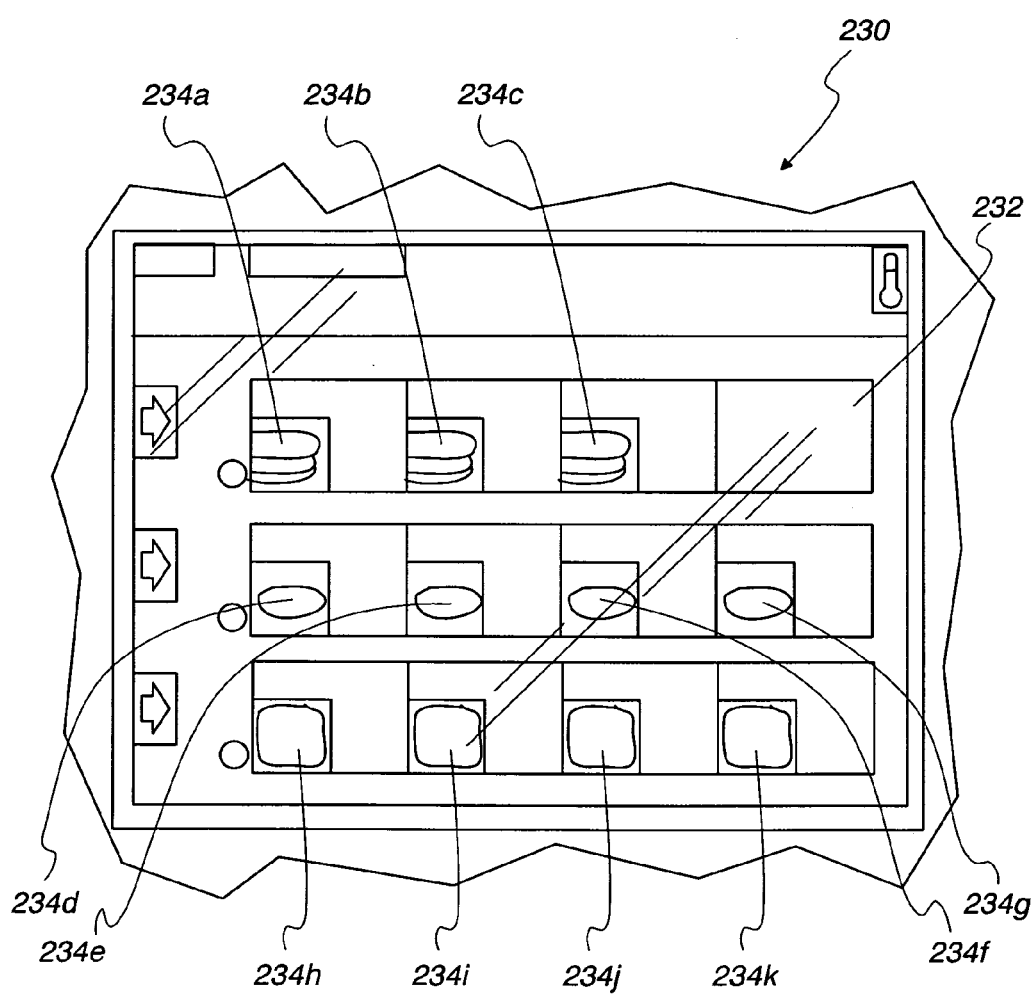
FIG. 8 is a perspective view illustrating a display used with the staging device in accordance with the invention.

FIG. 8 illustrates a display screen 230 to be mounted to a staging device. Display screen 230 can be any type of screen that will indicate the amount of time a tray has been in a staging device slot or position. Typically, display screen 230 will be a touch-screen interface 232 that will allow the user to quickly see the status of the contents of the staging device without having a unique display for each tray position. In one embodiment, indicators of different colors, brightness, or duplicity will identify trays that contain food that is approaching the end of its allowable holding time. Icons 234*a-k* allow for easy programming and visualization of the contents of a staging device. Additionally, the food contents of each tray may be displayed on display screen 230. Display screen 230 can also be quickly programmed with touch-screen interface 232. Alternatively, display screen 230 can be programmed with a personal data assistant or other external device.

Figure 9:
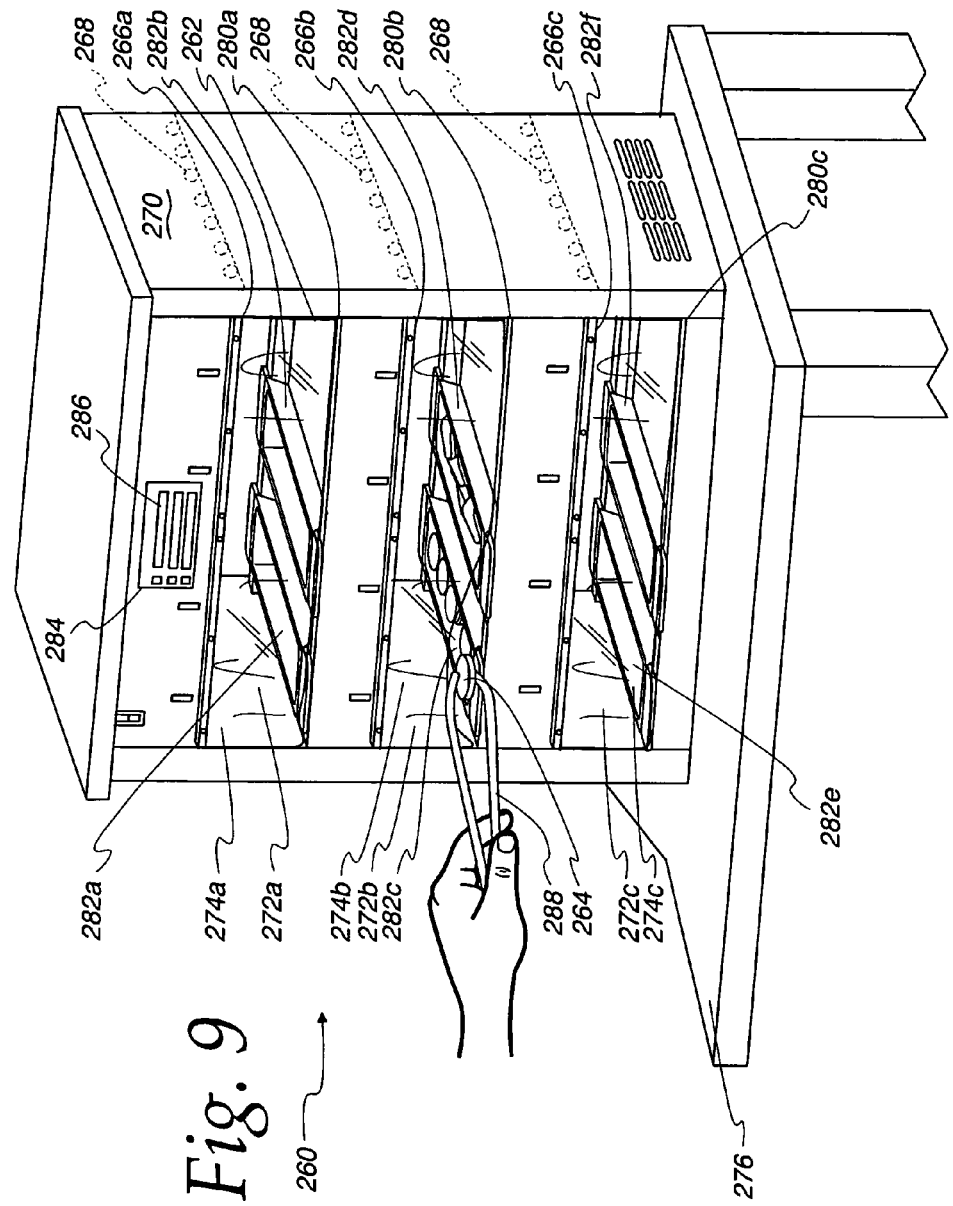
FIG. 9 is a perspective view illustrating a method in accordance with the invention for using the staging device to store previously cooked foods.

An alternative embodiment of the present invention is illustrated in FIG. 9, illustrating a method for storing previously cooked foods. A staging device 260 is provided. Staging device 260 comprises at least one compartment 262 for holding food portions 264 bounded by an upper compartment surface 266*a-c*, a heating device 268 for maintaining an elevated temperature in the compartment, a cabinet 270 defining a volume that encloses compartment 262 and therein including at least one slot 272*a-c* for removing food portions from compartment 262, and a flexible member 274*a-c* covering at least an upper portion of slot 272*a-c*. Cabinet 270 is housed on top of a table 276. Table 276 can be any type of table or stand of appropriate size and strength to support cabinet 270. Staging device 260 may further comprise a lower heating device.

Flexible member 274*a-c* is at least substantially air impermeable and is readily deflectable to permit access to the interior of compartment 262 for removing items therefrom. Flexible member 274*a-c* further limits the amount of airflow into and out of compartment 262. Flexible member 274a-c is attached by any available means to compartment 262. Flexible member 274a-c covers a large portion of slot 272a-c, leaving a gap 280a-c in between the bottom of flexible member 274a-c and the bottom of compartment 262. Gap 280a-c permits an amount of airflow into and out of compartment 262. This airflow allows for the storage of breaded or fried foods in staging device 260 without becoming soggy. The breaded or fried foods maintain their fresh and crispy quality during storage in staging device 260.

Staging device 260 further comprises at least one tray 282a-f. Tray 282a-f will hold any food stored in staging device 260. Tray 282a-f can be any suitable material such as plastic or metal. Typically, tray 282a-f will be a metal tray. Preferably, tray 282a-f will be aluminum, allowing for a quick transfer of heat to the food product being stored. Additionally, tray 282a-f will comprise ridges in the bottom of the tray, minimizing the contact between the food product and tray 282a-f. Tray 282a-f may further comprise an RFID tag.

Tray 282a-f can be of any suitable dimensions to fit into staging device 260. Typically, trays 282a-f are sized to easily fit into slot 272a-c. Typically, flexible member 274a-c will extend to be within approximately 2 inches of the top of tray 282a-f. Preferably, flexible member 274a-c will extend beyond the top of tray 282a-f.

Staging device 260 may further comprise a display screen 284. Display screen 284 can be any type of screen that will indicate the amount of time a tray has been in staging device 260. Typically, display screen 284 will be a touch-screen interface 286 that will allow the user to quickly see the status of the contents of the staging device without having a unique display for each tray position. In one embodiment, indicators of different colors, brightness, or duplicity will identify trays that contain food that is approaching the end of its allowable holding time. Additionally, the food contents of each tray 282 a-f may be displayed on display screen 284. Display screen 284 can also be quickly programmed with touch-screen interface 286. Alternatively, display screen 284 can be programmed with a personal data assistant or other external device.

Previously cooked food portions 264 are placed into staging device 260 using tongs 288, or any other gripping device. Previously cooked food portions 264 are stored in staging device 260 for a period of time, the maximum period of time as displayed on display screen 284. Flexible member 274a-c easily deflects to allow previously cooked food portions 264 to be easily added to and removed from staging device 260.

A method of preparing a sandwich is further provided. A staging device for holding a plurality of food portions is provided. The staging device comprises at least one compartment for holding the food portions having a compartment height and bounded by an upper heated compartment surface, a heating device for maintaining an elevated temperature in the compartment, a cabinet defining a volume that encloses the compartment therein including at least one slot for removing the food portions from the compartment, and a flexible member covering at least an upper portion of the slot, where the flexible member is readily deflectable to permit access to the interior of the compartment for removing items therefrom and limiting the amount of airflow into and out of the compartment. Previously cooked food is placed into the staging device. The previously cooked food is stored in the staging device for a period of time and subsequently removed. The previously cooked food is assembled together with another suitable sandwich component or components, which may be a bread component, to make a sandwich.

The bread component can be any bread-like food used to prepare a sandwich. Examples include a bun, whole wheat bun, multi-grain bun, bread slice, muffin, hotcake, bagel, and any other type of bread product which can be used as part of a sandwich. In the case where the food item stored in the staging device is a bread component, the other suitable sandwich component or components may be any desired meat or sandwich filling item, including, for example, a sausage patty, a cooked egg, Canadian bacon, a hamburger patty, a chicken or fish filet, vegetables, cheese, or any combinations thereof.

Optionally, additional sandwich ingredients are added to the previously cooked food or bread component to create a sandwich. Sandwich ingredients include ketchup, mustard, mayonnaise, pickle, onion, tomato, lettuce, or any other condiment or component that may be enjoyable on a sandwich.

EXAMPLE

The invention can be more fully understood by reference to the following example, which is representative of a specific example, but in no way limits the present invention.

A staging device is provided. The staging device comprises at least one compartment for holding the food portions having a compartment height and bounded by an upper heated compartment surface, a heating device for maintaining an elevated temperature in the compartment, a cabinet defining a volume that encloses the compartment therein including at least one slot for removing the food portions from the compartment, and a flexible member covering at least an upper portion of the slot, where the flexible member is readily deflectable to permit access to the interior of the compartment for removing items therefrom and limiting the amount of airflow into and out of the compartment.

Previously cooked food, such as breaded chicken breast, is placed into the staging device. The previously cooked breaded chicken is stored in the staging device for a period of approximately 15 minutes and subsequently removed. The previously cooked breaded chicken is placed onto a bottom bun. Mayonnaise is spread on a top bun. Lettuce and a tomato are added to the breaded chicken breast. The top bun is placed on top of the breaded chicken breast. The breaded chicken breast sandwich is served and ready to eat.

While the invention has been described with respect to certain preferred embodiments, as will be appreciated by those skilled in the art, it is to be understood that the invention is capable of numerous changes, modifications and rearrangements, and such changes, modifications and rearrangements are intended to be covered by the following claims.

What is claimed is:

1. A device for holding a plurality of food portions at an elevated temperature comprising:
   a cabinet defining a volume and enclosing a first compartment above a second compartment, each of said compartments for holding food portions and comprising at least one slot for removing food portions therefrom, having a compartment height and being bounded by an upper heated compartment surface;
   a heating device located in the cabinet for maintaining each compartment at an elevated temperature; and
   a first at least generally vertically disposed continuous flexible member covering and extending across at least an upper and substantial portion of the compartment slot of the first compartment, said first flexible member being readily deflectable to permit access to the interior of the first compartment for removing food items therefrom, the first flexible member permitting a limited amount of airflow into and out of the first compartment through a lower portion of the compartment slot of the first compartment said first flexible member forming a first gap between said first flexible member and the bottom of said compartment slot of the first compartment to permit insertion of a tray into the cabinet, wherein the gap is between about 0.5 inches and about 4 inches high, and wherein the compartment height is between about 5 inches and about 7 inches, said first gap allowing airflow into and out of said cabinet, a second at least generally vertically disposed continuous flexible member covering and extending across at least an upper and substantial portion of the compartment slot of the second compartment, said second flexible member being readily deflectable to permit access to the interior of the second compartment for removing food items therefrom, the second flexible member permitting a limited amount of airflow into and out of the second compartment through a lower portion of the compartment slot of the second compartment, said second flexible member forming a second gap between said second flexible member and the bottom of said compartment slot of the second compartment to permit insertion of a tray into the cabinet, wherein the second gap is between about 0.5 inches and about 4 inches high, and wherein the second compartment height is between about 5 inches and about 7 inches, said second gap allowing airflow into and out of said cabinet.

2. The device of claim 1 wherein the first compartment is further bounded by a lower heated surface.

3. The device of claim 2 further comprising at least one raised curb attached to said lower surface.

4. The device of claim 1 further comprising at least one tray for containing the food portions.

5. The device of claim 1 wherein said first gap is approximately two inches.

6. The device of claim 1 wherein said first flexible member comprises an upper portion and a lower portion, and the lower portion has a high air permeability.

7. The device of claim 6 wherein said first flexible member has a high air permeability.

8. The device of claim 1 wherein said first flexible member is at least substantially air impermeable.

9. The device of claim 1 further comprising a main control panel for programming parameters.

10. The device of claim 9 wherein said device is a main device and further comprising at least one satellite device connected to said main device wherein said satellite device comprises:

a cabinet defining a volume and enclosing at least one compartment for holding the food portions, said compartment comprising at least one slot for removing food portions therefrom, having a compartment height and being bounded by an upper heated compartment surface;

a heating device located in the cabinet for maintaining the compartment at an elevated temperature; and an at least generally vertically disposed continuous flexible member covering at least an upper and substantial portion of the compartment slot, said flexible member being readily deflectable to permit access to the interior of the compartment for removing food items therefrom, the flexible member permitting a limited amount of airflow into and out of the compartment through a lower portion of the compartment slot; wherein said satellite device is controlled by said main control panel, said flexible member forming a gap between said flexible member and the bottom of said compartment slot to permit insertion of a tray into the cabinet, wherein the gap is between about 0.5 inches and 4 inches high, and wherein the compartment height is between about 5 inches and about 7 inches.

11. The device of claim 1 wherein the first flexible member comprises a sheet of PTFE.

12. The device of claim 1 wherein the first flexible member has a thickness in the range of from 0.004 to 0.010 inches.

13. The device of claim 1 wherein the first flexible member is transparent.

14. The device of claim 11 wherein the first flexible member is air permeable.

15. The device of claim 14 wherein the first flexible member comprises a plurality of perforations to provide the air permeability.

16. The device of claim 6 wherein the first flexible member comprises a plurality of perforations to provide the air permeability.

17. The device of claim 4 wherein the tray has an open top and the first flexible member extends within approximately 2 inches below the open top when the tray is in the compartment.

18. The device of claim 1 wherein the exterior of the cabinet comprises the flexible member.

* * * * *